United States Patent [19]

Matsushima

[11] Patent Number: 5,239,334
[45] Date of Patent: Aug. 24, 1993

[54] CAMERA

[75] Inventor: Hiroshi Matsushima, Tokyo, Japan

[73] Assignee: Canon Kabushiki Kaisha, Tokyo, Japan

[21] Appl. No.: 796,444

[22] Filed: Nov. 22, 1991

[30] Foreign Application Priority Data

Nov. 26, 1990 [JP] Japan .................................. 2-317835

[51] Int. Cl.$^5$ .............................................. G03B 7/00
[52] U.S. Cl. ..................................... 354/412; 354/413
[58] Field of Search .................. 354/413, 70, 412, 419

[56] References Cited

U.S. PATENT DOCUMENTS

| | | | |
|---|---|---|---|
| 4,363,542 | 12/1982 | Kondo et al. | 354/413 |
| 4,500,191 | 2/1985 | Yamanaka | 354/419 |
| 4,550,996 | 11/1985 | Taniguchi et al. | 354/416 |
| 4,705,382 | 11/1987 | Mukai et al. | 354/412 |
| 5,051,769 | 9/1991 | Hayashi et al. | 354/419 |

Primary Examiner—Donald A. Griffin
Assistant Examiner—Jae N. Noh

[57] ABSTRACT

A camera of the kind permitting a shot either without any flash device or with a flash device is arranged to set a first camera-shake limit shutter speed to be used for a normal shot to be taken without using a flash device and a second camera-shake limit shutter speed for a flash shot to be taken by using a flash device and to select the first camera-shake limit shutter speed or the second camera-shake limit shutter speed according to whether the camera is in the normal shot mode or in the flash shot mode. With the camera arranged in this manner, the camera-shake limit shutter speed can be prevented from becoming an unnecessarily high speed when the camera is in the flash shot mode and can be set at adequate speeds both in the normal shot mode and in the flash shot mode. Therefore, a shot can be taken without causing the photographer any uncertainty in each of the two different modes.

29 Claims, 2 Drawing Sheets

CAMERA

BACKGROUND OF THE INVENTION

1. Field of the Invention

This invention relates to a camera which permits photographing either without using any flash device or using a flash device.

2. Description of the Related Art

The conventional cameras have been arranged to pay no heed to its photographing mode in determining a shutter speed which is the threshold of an adverse effect of a camera shake on the result of a shot and is called a "camera-shake limit shutter speed". Even in the case of a camera of the kind arranged to give a warning against a camera shake, the camera-shake limit shutter speed is set at "1/(focal-length of lens in use)" irrespective as to whether or not a shot is to be taken by using a flash device and the warning against a camera shake is given whenever the shutter speed is lower than the camera-shake limit shutter speed. In other words, in the conventional camera, a camera-shake limit shutter speed for a flash shot mode, i.e., flash photography, in which a flash device is used, is set at the same value as a camera-shake limit shutter speed for a normal shot mode in which no flash device is used.

However, the result of a shot is less affected by a camera shake in the flash shot mode than in the normal shot mode. In the flash shot mode, therefore, the camera-shake limit shutter speed can be set at a lower speed than in the normal shot mode for obtaining a picture which is not affected by a camera shake.

With the camera-shake limit shutter speed for the flash shot mode thus set at the same value as the camera-shake limit shutter speed for the normal shot mode in which no flash device is used, the conventional camera has been arranged to give a warning indicating that no shot is possible without being affected by a camera shake, while, in actuality, the shot could be taken without being affected by a camera shake. In short, the conventional camera has been arranged to set the camera-shake limit shutter speed at an unnecessarily high speed for the flash shot mode.

SUMMARY OF THE INVENTION

One aspect of the invention lies in the provision of a camera which is of the kind permitting a shot either without any flash device or with a flash device and is arranged to set a first camera-shake limit shutter speed to be used for a normal shot to be taken without using a flash device and a second camera-shake limit shutter speed for a flash shot to be taken by using a flash device and to select the first camera-shake limit shutter speed or the second camera-shake limit shutter speed according to whether the camera is in the normal shot mode or in the flash shot mode.

With the camera arranged in the above-stated manner, the camera-shake limit shutter speed can be prevented from becoming an unnecessarily high speed when the camera is in the flash shot mode and can be set at adequate speeds both in the normal shot mode and the flash shot mode, respectively. The arrangement ensures that a shot can be taken without giving causing uncertainty to the photographer in each of the two modes.

The above and other aspects and features of the invention will become apparent from the following detailed description of embodiments thereof taken in connection with the accompanying drawings.

DETAILED DESCRIPTION OF THE PREFERRED EMBODIMENTS

The details of this invention are described below through embodiments thereof with reference to the accompanying drawings:

In the case of a first embodiment, the invention is applied to a camera of the kind arranged to compute a camera-shake limit shutter speed on the basis of the focal length of a lens in use and to give a warning against a possible adverse effect of a camera shake when an intended shutter speed for a shot is slower than the camera-shake limit shutter speed.

Figure 1:
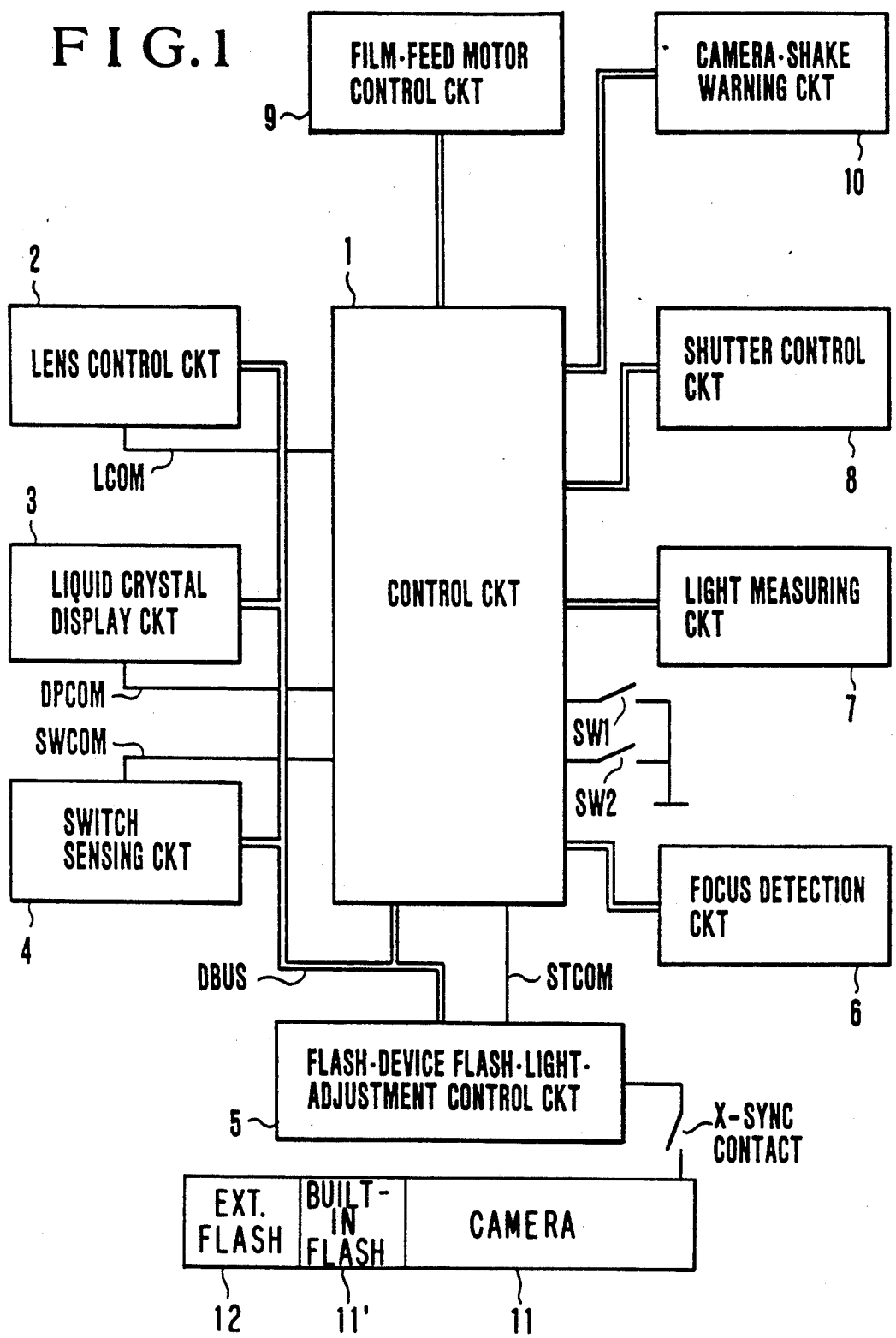
FIG. 1 is a block diagram showing the circuit arrangement of a camera which is arranged as an embodiment of the invention.

FIG. 1 shows in a block diagram the circuit arrangement of the camera embodying this invention. A control circuit 1 is a microcomputer or the like and is arranged to control the action of each of the various parts of the camera. A lens control circuit 2 is arranged to drive and control a motor for adjustment of the focus of a photo-taking lens which is not shown and also a motor for controlling diaphragm blades. The lens control circuit 2 receives motor driving information supplied by serial communication through a data bus DBUS while a signal LCOM is being received from the control circuit 1. The lens control circuit 2 performs the driving control over the above-stated motors in accordance with the motor driving information and, at the same time, sends information on various matters relative to the lens, such as the focal length, etc., to the control circuit 1 by the serial communication. A liquid crystal display circuit 3 is arranged to drive a liquid crystal display device which is not shown but is arranged to inform the photographer of a shutter speed, an aperture value, a film sensitivity (ISO) value, a number of frames of the film, etc. The liquid crystal display circuit 3 receives display data sent by serial communication via the data bus DBUS, while receiving a signal DPCOM from the control circuit 1, and drives the liquid crystal display device in accordance with the display data received.

A switch sensing circuit 4 is arranged to read the states of switches provided for setting various photographing conditions and those of switches indicating the state of the camera. The switch sensing circuit 4 sends the switch data thus obtained to the control circuit 1 by serial communication via the data bus DBUS while receiving a signal SWCOM from' the control circuit 1. A flash-device flash-light-adjustment control circuit 5 is arranged to control a flashing terminating part operating according to the flashing action of a flash device and also according to light obtained through the lens. The flash-device flash-light-adjustment control circuit 5 receives flash-device control data sent by serial communication via the data bus DBUS and performs control of varied kinds according to the data while receiving a signal STCOM from the control circuit 1. A focus detection circuit 6 is a unit consisting of a line sensor which is provided for an automatic focusing (AF) action to be performed by a known phase difference detecting method and a circuit which is arranged to read out data accumulated by the line sensor. The operation of the focus detection circuit 6 is controlled by the control circuit 1.

A light measuring circuit 7 is arranged to measure the light of an object to be photographed and to send the result of light measurement to the control circuit 1. The light measuring circuit 7 operates under the control of the control circuit 1. A shutter control circuit 8 is arranged to control the travel of leading and trailing shutter curtains (not shown) in accordance with control signals coming from the control circuit 1. A film-feed motor control circuit 9 is arranged to control a film-feed (winding and rewinding) motor in accordance with control signals coming from the control circuit 1. A camera-shake warning circuit 10 is arranged to give a camera-shake warning in accordance with a control signal coming from the control circuit 1.

A switch SW1 is arranged to be turned on to initiate the operation of the camera by a first stroke of a shutter release button. Upon detection of the fact that the switch SW1 is turned on, the control circuit 1 causes a light measuring action, a distance measuring action and a display action to begin. A switch SW2 is arranged to be turned on by the second stroke of the shutter release button. Upon detection of the fact that the switch SW2 is turned on, the control circuit 1 causes an exposure action to begin. An X-sync contact is arranged to turn on upon completion of the travel of the leading curtain of the shutter of camera 11 and to inform the flash-device flash-light-adjustment control circuit 5 of timing for flashing the built-in flash device 11 or external flash device 12.

Figure 2:
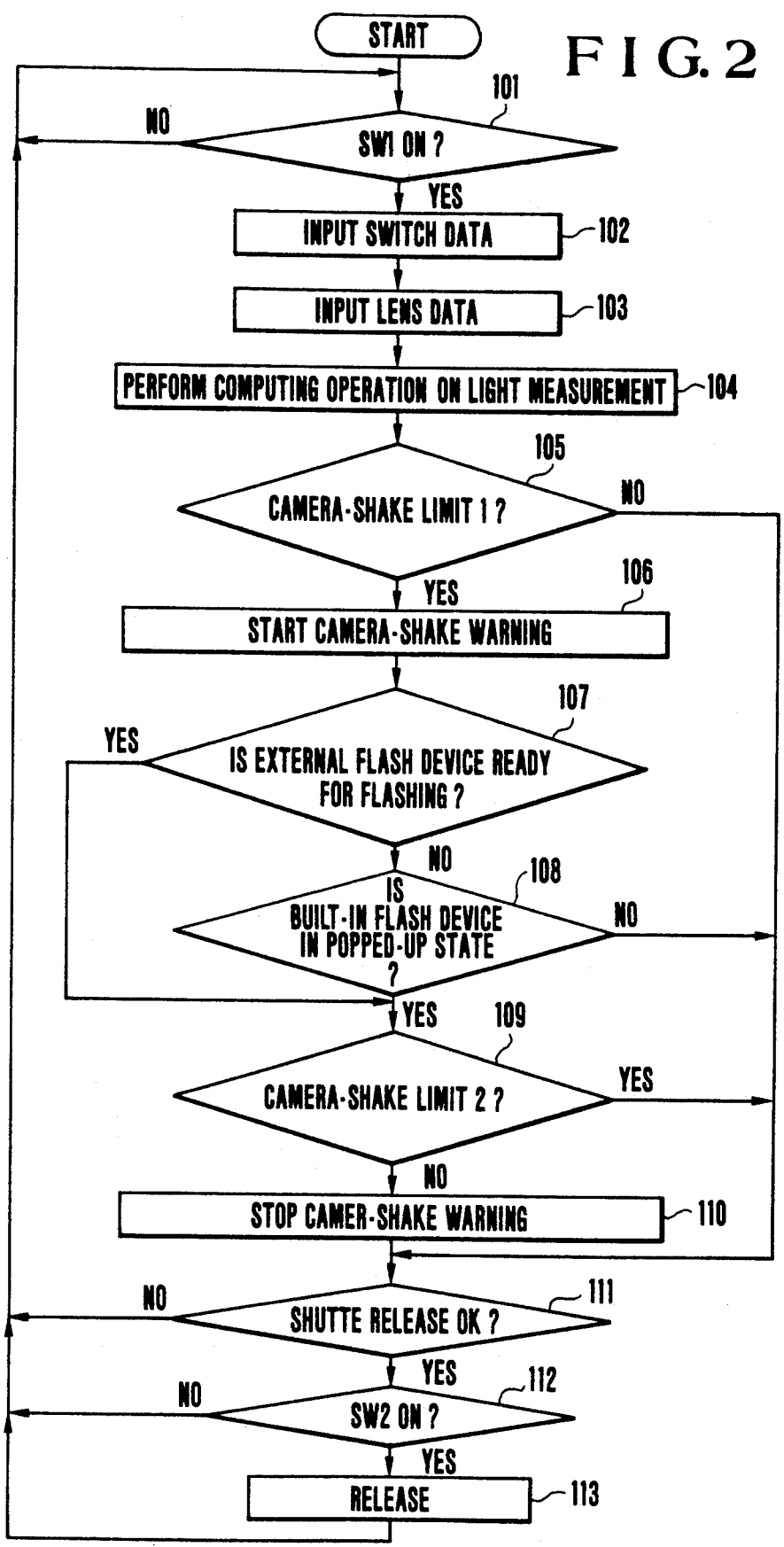
FIG. 2 is a flow chart showing the operation of the main part of a control circuit included in the camera shown in FIG. 1.

Next, the operation of the main part of the control circuit 1 shown in FIG. 1 is described with reference to FIG. 2 which is a flow chart. Referring to FIG. 2, when the power supply of the camera is turned on, the flow of operation begins from a step 101. STEP 101: When the switch SW1 turns on with the shutter release button pushed, the on-state of the switch SW1 is detected by the control circuit 1. STEP 102: The control circuit 1 supplies the signal SWCOM to the switch sensing circuit 4. Then, as mentioned above, the switch sensing circuit 4 sends switch data indicating the states of switches to the control circuit 1 through the data bus DBUS.

STEP 103: Upon receipt of the signal LCOM from the control circuit 1, the lens control circuit 2 serially supplies lens data, including the focal length of the lens, a minimum aperture, a maximum aperture and an AF (automatic focusing) condition, to the control circuit 1. STEP 104: The light measurement output of the light measuring circuit 7 corresponding to the luminance of the object is taken in by the control circuit 1. At the control circuit 1, the light measurement output is A/D-converted, and exposure conditions including an aperture value and a shutter speed value are computed. STEP 105: A first camera-shake limit shutter speed or "camera-shake limit 1" is set on the basis of the focal length of the lens obtained at the step 103. The value of the "camera-shake limit 1" is compared with the current shutter speed value which is computed at the step 104 to find if the computed shutter speed is lower than the speed of the "camera-shake limit 1". If so, the flow proceeds to a step 106. If not, the flow comes to a step 111.

The value of the "camera-shake limit 1" is set, in this case, at "1/(focal-length of lens)".

STEP 106: The camera-shake warning circuit 10 is caused to give a camera-shake warning. STEP 107: A check is made to find if an external flash device is ready for flashing. The external flash device is mounted on the outside of the camera and is ready for flashing when it is completely charged with electricity. If the external flash device is found to be ready for flashing, the flow comes to a step 109. If not, the flow comes to a step 108. STEP 108: A check is made for the state of a built-in flash device. More specifically, a check is made for a popped-up state of the built-in flash device. If the built-in flash device is found to be in the popped-up state, the flow comes to the step 109. If not, the flow comes to a step 111. In this case, the term "popped-up state" means that the built-in flash device is ready for flashing. A non-popped-up state of the built-in flash device means that the built-in flash device remains in a stowed position within the camera body. The method of finding that the built-in flash device is ready for flashing is not limited to the above-stated method. For example, the built-in flash device may be determined to be ready for flashing if the built-in flash device is in a state of being completely charged with electricity or if the built-in flash device is both in the popped-up state and in the state of being completely charged with electricity.

STEP 109: With either the external flash device or the built-in flash device being ready for flashing, that is, when the camera is in a flash shot mode, a second camera-shake limit shutter speed, or "camera-shake limit 2" is set on the basis of the focal length of the lens found at the step 103. The shutter speed computed at the step 104 is compared with the "camera-shake limit 2". If the shutter speed is found to be lower than the "camera-shake limit 2", the flow comes to a step 111, leaving the camera-shake warning as it is. If not, the flow comes to a step 110.

The "camera-shake threshold 2" is obtained in accordance with a formula $\{"1/(\text{focal-length of lens})" + a\}$.

STEP 110: The camera-shake warning circuit 10 is instructed to stop giving the camera-shake warning. STEP 111: A discrimination is made between a shutter release permissible state and a shutter release inhibiting state. If the camera is in the shutter release permissible state, the flow comes to a step 112. If the camera is in the shutter release inhibiting state, the flow comes back to the step 101. In this case, the shutter release permissible state is determined on various conditions, including the fact that an AF action is completed and the fact that the voltage of power supply is above a given value.

STEP 112: A check is made to find if the switch SW2 has been turned on. If not, the flow comes back to the step 101. If so, the flow proceeds to a step 113. STEP 113: The leading and trailing shutter curtains are caused to travel through the shutter control circuit 8. After that, the film is caused to be wound through the film-feed motor control circuit 9. After completion of film winding, the flow comes back to the step 101.

In the case of this embodiment, the camera-shake limit shutter speed for the normal shot mode (natural light photography) is set at "1/(focal-length of lens)", i.e., at 1/200 sec if, for example, the focal length is 200 mm; and the camera-shake limit shutter speed for a flash shot mode (flash photography) is set at $\{"1/(\text{focal-length of lens})" + a\}$, i.e., at 1/125 sec with the focal length assumed to be 200 mm. Therefore, the camera-shake warning can be appositely given even in the case of flash photography.

In a second embodiment of the invention, the flow of operation of the first embodiment described in the foregoing is modified as follows: The step 106 is changed to a step 106(a) "set camera-shake warning"; the step 110 is changed to a step 110a "reset camera-shake warning"; and an additional step 110(b) is provided between the steps 108 and 111 and between the steps 109 and 111 to make "camera-shake warning display". More specifically, the flow of operation of the second embodiment is as follows: The steps 101 to 105 are the same as in the case of the first embodiment described in the foregoing. STEP 106(a): Instead of giving the camera-shake warning, the camera shake-warning is just set and has not been given as yet. The steps 107 to 109 are the same as in the first embodiment. STEP 110(a): The camera-shake warning set at the step 106(a) is canceled. The steps 109 and 110 are the same as in the first embodiment. STEP 110(b): A check is made to find if the camera-shake warning is set. If so, a camera-shake warning is displayed. The steps 111 to 113 are the same as in the first embodiment.

In accordance with the arrangement of the embodiment described, the first camera-shake limit shutter speed for the normal shot mode and the second camera-shake limit shutter speed for the flash shot mode are computed by a computing means on the basis of the focal length of the lens detected by a focal length detecting means, and are outputted to a camera-shake warning control means. The arrangement is such that the threshold shutter speed at which the camera-shake warning must be given in the flash shot mode is differentiated from the threshold shutter speed at which the camera-shake warning must be given in the normal shot mode. The embodiment is thus arranged to be capable of giving camera-shake warnings apposite to the normal shot mode and to the flash shot mode, respectively, so that no disagreeable impression is given to the photographer.

Further, in the case of each of the embodiments described, this invention is applied to a camera of the kind arranged to give a camera-shake warning when a shutter speed intended to be used for a shot is lower than the camera-shake limit shutter speed. The invention is, however, also applicable to a camera of the kind arranged to set the camera at a camera-shake limit shutter speed in a case where an intended shutter speed is lower than the camera-shake limit shutter speed.

What is claimed is:

1. A camera comprising:
   a) discrimination means for discriminating between a first mode in which a shot is to be taken without using a flash device and a second mode in which a shot is to be taken using the flash device; and
   b) control means for changing a camera-shake limit shutter speed in response to an output of said discrimination means.

2. A camera according to claim 1, wherein a camera-shake limit shutter speed to be used in the second mode is lower than a camera-shake limit shutter speed to be used in the first mode.

3. A camera according to claim 1, wherein said flash device is built in a body of the camera, and wherein, when the camera is in the second mode, said flash device is in a popped-up state.

4. A camera according to claim 1, wherein said flash device is capable of being externally attached to a body of the camera, and wherein, when the camera is in the second mode, said flash device is externally attached to the body of the camera in a state of having been completely charged with electricity.

5. A camera according to claim 2, wherein said flash device is built in a body of the camera, and wherein, when the camera is in the second mode, said flash device is in a popped-up state.

6. A camera according to claim 2, wherein said flash device is capable of being externally attached to a body of the camera, and wherein, when the camera is in the second mode, said flash device is externally attached to the body of the camera in a state of having been completely charged with electricity.

7. A camera according to claim 1, further comprising camera-shake warning means for giving a warning when a shutter speed intended for a shot is lower than the camera-shake limit shutter speed.

8. A camera according to claim 7, wherein said camera-shake warning means is arranged to give a warning by making a display.

9. A camera according to claim 2, further comprising camera-shake warning means for giving a warning when a shutter speed intended for a shot is lower than the camera-shake limit shutter speed.

10. A camera according to claim 9, wherein said camera-shake warning means is arranged to give a warning by making a display.

11. A camera according to claim 1, further comprising focal length detection means for detecting the focal length of a lens, and computing means for computing, on the basis of the focal length detected, camera-shake limit shutter speeds respectively for the first mode and for the second mode.

12. A camera according to claim 1, further comprising light measuring means for measuring the luminance of an object to be photographed, and exposure condition computing means for computing, on the basis of a value of the luminance measured by said light measuring means, an aperture value and a shutter speed.

13. A camera according to claim 12, wherein said exposure condition computing means is arranged to set a shutter speed to be used for a shot at the camera-shake limit shutter speed when the shutter speed computed is lower than the camera-shake limit shutter speed.

14. A camera according to claim 2, further comprising focal length detection means for detecting the focal length of a lens, and computing means for computing, on the basis of the focal length detected, camera-shake limit shutter speeds respectively for the first mode and for the second mode.

15. A camera according to claim 2, further comprising light measuring means for measuring the luminance of an object to be photographed, and exposure condition computing means for computing, on the basis of a value of the luminance measured by said light measuring means, an aperture value and a shutter speed.

16. A camera according to claim 15, wherein said exposure condition computing means is arranged to set a shutter speed to be used for a shot at the camera-shake limit shutter speed when the shutter speed computed is lower than the camera-shake limit shutter speed.

17. A camera comprising:
   a) determining means for determining whether or not the degree of an adverse effect of a camera shake on the result of a shot is within an allowable range; and
   b) control means for changing a threshold value to be used as reference for determination by said determining means according to whether a photographing mode of the camera is a first mode in which a shot is to be taken without using a flash device or a second mode in which a shot is to be taken by using the flash device.

18. A camera according to claim 17, wherein said determining means is arranged to make the determination by comparing a shutter speed with the threshold value.

19. A camera according to claim 18, wherein said threshold value is a camera-shake limit shutter speed, and wherein said determining means is arranged to determine that the adverse effect of a camera shake on the result of a shot exceeds the allowable range when a shutter speed is lower than said threshold value.

20. A camera according to claim 19, wherein the camera-shake limit shutter speed for the second mode is lower than the camera-shake limit shutter speed for the first mode.

21. A camera according to claim 20, wherein said flash device is built in a body of the camera, and wherein, when the camera is in the second mode, said flash device is in a popped-up state.

22. A camera according to claim 20, wherein said flash device is capable of being externally attached to a body of the camera, and wherein, when the camera is in the second mode, said flash device is externally attached to the body of the camera in a state of having been completely charged with electricity.

23. A camera according to claim 20, further comprising camera-shake warning means for giving a camera-shake warning when said determining means determines that the adverse effect of a camera shake on the result of a shot exceeds the allowable range.

24. A camera according to claim 23, wherein said camera-shake warning means is arranged to give a camera-shake warning by making a display.

25. A camera according to claim 20, further comprising focal length detection means for detecting the focal length of a lens, and computing means for computing, on the basis of the focal length detected, camera-shake limit shutter speeds respectively for the first mode and for the second mode.

26. A camera according to claim 20, further comprising light measuring means for measuring the luminance of an object to be photographed, and exposure condition computing means for computing, on the basis of a value of the luminance measured by said light measuring means, an aperture value and a shutter speed.

27. A camera according to claim 26, wherein said exposure condition computing means is arranged to set a shutter speed to be used for a shot at the camera-shake limit shutter speed when the shutter speed computed is lower than the camera-shake limit shutter speed.

28. A device for setting a camera-shake limit shutter speed for a camera, comprising
(a) a set circuit for selectively setting a first limit shutter speed for a flash photography and a second limit shutter speed, which is different from the first limit shutter speed, for non-flash photography; and
(b) a control circuit for setting first limit shutter speed in the set circuit for flash photography and setting the second limit shutter speed in the set circuit for non-flash photography.

29. A device according to claim 28, wherein said first limit shutter speed is longer than said second limit shutter speed.

* * * * *

UNITED STATES PATENT AND TRADEMARK OFFICE
CERTIFICATE OF CORRECTION

PATENT NO. : 5,239,334
DATED : August 24, 1993
INVENTOR(S) : Hiroshi Matsushima

It is certified that error appears in the above-identified patent and that said Letters Patent is hereby corrected as shown below:

ON THE TITLE PAGE
    UNDER "Assistant Examiner - Jae N. Noh"
    Insert: --Attorney, Agent or Firm - Fitzpatrick, Cella, Harper and Scinto--.

COLUMN 1:
    line 11, "its" should read --their--; and
    line 64, "giving" should be deleted.

COLUMN 2:
    line 16, "drawings:" should read --drawings.--.

COLUMN 3:
    line 32, "device 11" should read --device 11'--.

COLUMN 8:
    line 22, "comprising" should read --comprising:--; and
    line 32, "speed is longer" should read --speed is slower--.

Signed and Sealed this

Thirteenth Day of September, 1994

Attest:

BRUCE LEHMAN

Attesting Officer      Commissioner of Patents and Trademarks